United States Patent
Ko et al.

(10) Patent No.: US 10,383,099 B2
(45) Date of Patent: Aug. 13, 2019

(54) EFFICIENT CONTROL INFORMATION TRANSMISSION METHOD AND APPARATUS FOR SUPPORTING MULTIPLE ANTENNA TRANSMISSION TECHNIQUE

(71) Applicant: BLACKBERRY LIMITED, Waterloo, Ontario (CA)

(72) Inventors: Hyun Soo Ko, Anyang-si (KR); Jae Hoon Chung, Anyang-si (KR); Bin Chul Ihm, Anyang-si (KR); Moon Il Lee, Anyang-si (KR)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/958,974

(22) Filed: Apr. 20, 2018

(65) Prior Publication Data

US 2018/0242308 A1 Aug. 23, 2018

Related U.S. Application Data

(63) Continuation of application No. 15/391,721, filed on Dec. 27, 2016, now Pat. No. 9,986,542, which is a (Continued)

(30) Foreign Application Priority Data

Nov. 9, 2010 (KR) .................. 10-2010-0110816

(51) Int. Cl.
*H04B 7/06* (2006.01)
*H04W 72/04* (2009.01)
(Continued)

(52) U.S. Cl.
CPC ...... *H04W 72/0413* (2013.01); *H04B 7/0404* (2013.01); *H04B 7/0456* (2013.01);
(Continued)

(58) Field of Classification Search
CPC .......... H04W 72/042; H04W 72/0413; H04W 52/54; H04W 88/08; H04L 5/005;
(Continued)

(56) References Cited

U.S. PATENT DOCUMENTS

| | | | |
|---|---|---|---|
| 7,774,686 B2 | 8/2010 | Ahn et al. | |
| 7,921,347 B2 | 4/2011 | Kim et al. | |

(Continued)

FOREIGN PATENT DOCUMENTS

| | | |
|---|---|---|
| CN | 1689261 | 10/2005 |
| CN | 1838583 | 9/2006 |

(Continued)

OTHER PUBLICATIONS

U.S. Appl. No. 15/391,721, Notice of Allowance dated Jan. 19, 2018, 44 pages.

(Continued)

*Primary Examiner* — Curtis A Alia
(74) *Attorney, Agent, or Firm* — Fish & Richardson P.C.

(57) ABSTRACT

The present invention relates to a wireless communication system and provides an efficient control information transmission method and apparatus for supporting a multiple antenna transmission technique. A method is provided for transmitting downlink hybrid automatic repeat request (HARQ) information related to an uplink multiple codeword transmission and includes receiving the uplink multiple codeword transmission, generating HARQ information related to each of the multiple codewords based on a result of decoding each of the multiple codewords, modulating the HARQ information, and transmitting the modulated HARQ information via one or more physical HARQ indicator channels (PHICHs).

20 Claims, 8 Drawing Sheets

Related U.S. Application Data continuation of application No. 14/686,552, filed on Apr. 14, 2015, now Pat. No. 9,572,142, which is a continuation of application No. 14/450,029, filed on Aug. 1, 2014, now Pat. No. 9,036,512, which is a continuation of application No. 13/508,032, filed as application No. PCT/KR2010/007871 on Nov. 9, 2010, now Pat. No. 8,848,510.

(60) Provisional application No. 61/259,618, filed on Nov. 9, 2009.

(51) Int. Cl.
| | |
|---|---|
| *H04L 1/16* | (2006.01) |
| *H04L 1/18* | (2006.01) |
| *H04B 7/0456* | (2017.01) |
| *H04L 5/00* | (2006.01) |
| *H04L 5/14* | (2006.01) |
| *H04B 7/0404* | (2017.01) |
| *H04W 52/54* | (2009.01) |
| *H04B 7/0413* | (2017.01) |
| *H04W 88/08* | (2009.01) |

(52) U.S. Cl.
CPC ......... *H04B 7/0626* (2013.01); *H04L 1/1607* (2013.01); *H04L 1/1812* (2013.01); *H04L 1/1893* (2013.01); *H04L 1/1896* (2013.01); *H04L 5/005* (2013.01); *H04L 5/0055* (2013.01); *H04L 5/0057* (2013.01); *H04L 5/0092* (2013.01); *H04L 5/14* (2013.01); *H04W 52/54* (2013.01); *H04W 72/042* (2013.01); *H04B 7/0413* (2013.01); *H04B 7/068* (2013.01); *H04L 5/0023* (2013.01); *H04L 5/1469* (2013.01); *H04W 88/08* (2013.01)

(58) Field of Classification Search
CPC ... H04L 5/0023; H04L 5/0055; H04L 5/0057; H04L 5/0092; H04L 5/14; H04L 5/1469; H04L 1/1893; H04L 1/1896; H04L 1/1812; H04L 1/1607; H04B 7/0626; H04B 7/0456; H04B 7/068; H04B 7/0413; H04B 7/0404
See application file for complete search history.

(56) References Cited

U.S. PATENT DOCUMENTS

| | | | |
|---|---|---|---|
| 8,245,092 B2 | 8/2012 | Kotecha et al. | |
| 8,363,624 B2 | 1/2013 | Blanz et al. | |
| 8,630,654 B2 | 1/2014 | Aiba et al. | |
| 8,848,510 B2 | 9/2014 | Ko et al. | |
| 9,036,512 B2 | 5/2015 | Ko et al. | |
| 9,572,142 B2 | 2/2017 | Ko et al. | |
| 9,749,968 B2 | 8/2017 | Stern-Berkowitz et al. | |
| 2003/0118031 A1 | 6/2003 | Classon et al. | |
| 2008/0225964 A1 | 9/2008 | Han et al. | |
| 2009/0262695 A1* | 10/2009 | Chen ................... | H04L 5/0053 370/329 |
| 2009/0262856 A1 | 10/2009 | Onggosanusi et al. | |
| 2010/0088580 A1 | 4/2010 | Chun et al. | |
| 2010/0115358 A1 | 5/2010 | Kotecha et al. | |
| 2011/0026420 A1 | 2/2011 | Zhang et al. | |
| 2011/0026622 A1 | 2/2011 | Luo et al. | |
| 2011/0206014 A1 | 8/2011 | Lee et al. | |
| 2011/0239072 A1* | 9/2011 | Cai ....................... | H04L 1/1896 714/748 |
| 2012/0218882 A1 | 8/2012 | Ko et al. | |
| 2012/0307775 A1* | 12/2012 | Chung ................. | H04L 1/1671 370/329 |
| 2013/0170469 A1 | 7/2013 | Yu et al. | |
| 2014/0341096 A1 | 11/2014 | Ko et al. | |
| 2015/0223236 A1 | 8/2015 | Ko et al. | |
| 2016/0037524 A1 | 2/2016 | Krzymien et al. | |
| 2017/0111900 A1 | 4/2017 | Ko et al. | |

FOREIGN PATENT DOCUMENTS

| | | |
|---|---|---|
| CN | 101390322 | 3/2009 |
| KR | 10-2009-0082850 | 7/2009 |
| WO | 2007/145492 | 12/2007 |
| WO | 2009064059 | 5/2009 |
| WO | 09/118621 | 10/2009 |

OTHER PUBLICATIONS

European Patent Office Application Serial No. 10828578.4, Office Action dated Dec. 7, 2016, 7 pages.
Texas Instruments, "Layer Mapping Solution for Uplink SU-MIMO", R1-090589, 3GPP TSG RAN WG1 #56, Feb. 2009, 4 pages.
Motorola, "PHICH/PDCCH Interaction", R2-080416, 3GPP TSG-RAN WG2 #60bis, Jan. 2008, 4 pages.
State Intellectual Property Office of the People's Republic of China Application Serial No. 201510045363.1, Office Action dated Jul. 4, 2017, 22 pages.
European Patent Office Application No. 10828578.4, Search Report dated Dec. 7, 2016, 7 pages.
Texas Instruments, "Layer Mapping Solution for Uplink SU_MIMO," 3GPP TSG RAN WG1 #56, R1-090589, Feb. 9-13, 2009, 3 pages.
Motorola, "PHICH/PDCCH Interaction," 3GPP TSG-RAN WG2#60bis, R2-080416 based on R2-074658, Jan. 14-18, 2008, 4 pages.
State Intellectual Property Office of the People's Republic of China Application Serial No. 201510045363.1, Office Action dated Nov. 16, 2017, 14 pages.
Texas Instruments, "Uplink SU-MIMO for E-UTRA," 3GPP TSG RAN WG1 53bis, R1-082707, Jun. 2008, 9 pages.
Samsung, "PHICH Mapping in Asymmetric Carrier Aggregation", R1-092662, 3GPP TSG RAN WG1 Meeting #57bis, Jun. 2009.
NEC Group, "Downlink ACK/NACK signalling for E-UTRA", R1-073459, 3GPP TSG RAN WG1 #50, Aug. 2007.
LG Electronics, "Mapping Relations between UL VRB and DL ACK/NACK", R1-073479, 3GPP TSG RAN WG1 #50, Aug. 2007.
Alcatel-Lucent Shanghai Bell, et al., "HARQ Bundling with Layer Shifting for LTE-Advanced Uplink SU-MIMO," 3GPP TSG RAN WG1 #58bis, XP50597747,R1-093785, Oct. 2009, 6 pages.
NEC Group, "Views on LTE-A UL MIMO Issues," 3GPP TSG-RAN WG1 #56bis, XP50338839,R1-091224, Mar. 2009, 2 pages.
Motorola, "Open Issues on PDCCH Formats and Contents," 3GPP TSG RAN WG1 #52bis, XP50596688,R1-081287, Mar. 2008, 6 pages.
Ericsson, "MIMO Related DL Control Signalling," 3GPP TSG-RAN WG1 #51bis, XP50108860,R1-080341, Jan. 2008, 8 pages.
European Patent Office Application Serial No. 10828578.4, Search Report dated Mar. 3, 2016, 11 pages.

* cited by examiner (a)

(b)

EFFICIENT CONTROL INFORMATION TRANSMISSION METHOD AND APPARATUS FOR SUPPORTING MULTIPLE ANTENNA TRANSMISSION TECHNIQUE

CROSS-REFERENCE TO RELATED APPLICATIONS

This application is a continuation of U.S. application Ser. No. 15/391,721, filed on Dec. 27, 2016, currently pending, which is a continuation of U.S. application Ser. No. 14/686,552, filed on Apr. 14, 2015, now U.S. Pat. No. 9,572,142, which is a continuation of U.S. application Ser. No. 14/450,029, filed on Aug. 1, 2014, now U.S. Pat. No. 9,036,512, which is a continuation of U.S. application Ser. No. 13/508,032, filed on May 3, 2012, now U.S. Pat. No. 8,848,510, which is the National Stage filing under 35 U.S.C. 371 of International Application No. PCT/KR2010/007871, filed on Nov. 9, 2010, which claims the benefit of earlier filing date and right of priority to Korean Application No. 10-2010-0110816, filed on Nov. 9, 2010, and also claims the benefit of U.S. Provisional Application No. 61/259,618, filed on Nov. 9, 2009, the contents of all of which are incorporated by reference herein in their entireties.

DESCRIPTION

Technical Field

The present invention relates to a wireless communication system, and more particularly, to a method and apparatus for transmitting efficient control information in order to support a multiple antenna transmission technique.

Related Art

A Multiple Input Multiple Output (MIMO) scheme refers to a scheme for improving data transmission/reception efficiency using multiple transmission antennas and multiple reception antennas, unlike a scheme using one transmission antenna and one reception antenna. That is, a transmitter or a receiver of a wireless communication system uses multiple antennas so as to increase capacity or improve performance. The MIMO scheme may be called a multiple antenna technique.

In the multiple antenna transmission technique, there are a single codeword (SCW) scheme for simultaneously transmitting N data streams using one channel encoding block and a multiple codeword (MCW) scheme for transmitting N data streams using M (here, M is always equal to or less than N) channel encoding blocks. At this time, each channel encoding block generates an independent codeword and each codeword is designed to facilitate independent error detection.

In a system for transmitting multiple codewords, a receiver needs to inform a transmitter of success/failure of detection (decoding) of each codeword. Thus, the receiver may transmit a hybrid automatic repeat request (HARQ) ACK/NACK signal of each codeword to the transmitter.

DISCLOSURE

Technical Problem

Since only a HARQ operation for transmission of an uplink single codeword of a user equipment (UE) having a single antenna is defined in a conventional 3GPP LTE system, there is a need for definition of a HARQ operation for transmission and retransmission of multiple uplink codewords of a UE having multiple antennas and a method of configuring control information supporting the same.

Technical Solution

The object of the present invention can be achieved by providing a method of transmitting downlink hybrid automatic repeat request (HARQ) information in response to uplink multiple-codeword transmission, the method comprising receiving the uplink multiple-codeword transmission; generating HARQ information for each of the multiple-codeword based on a result of decoding of each of the multiple-codeword; modulating the HARQ information; and transmitting the modulated HARQ information on at least one physical HARQ indicator channel (PHICH).

The multiple-codeword may include two-codeword transmission, the HARQ information may be represented by 2 bits, and the modulating may be performed using a quadrature phase shift keying (QPSK) scheme.

The HARQ information may be generated as an ACK signal if all of the multiple-codeword are decoded and may be generated as a NACK signal if at least one of the multiple-codeword is not decoded, and the HARQ information may be transmitted on one PHICH.

The modulated HARQ information may be transmitted on a plurality of PHICHs and each of the plurality of PHICHs includes 1-bit HARQ information.

In another aspect of the present invention, there is provided a method of transmitting uplink multiple-codeword using a hybrid automatic repeat request (HARQ) scheme, the method including transmitting the uplink multiple-codeword, receiving downlink HARQ information for the uplink multiple-codeword transmission, and retransmitting the multiple-codeword if the HARQ information is a NACK signal, wherein the HARQ information is generated and modulated based on a result of decoding of each of the multiple-codeword and is received on at least one physical HARQ indicator channel (PHICH).

The HARQ information may include HARQ information for each of the multiple-codeword, and the retransmitting may include retransmitting, if the HARQ information for each of the multiple-codeword is NACK, a codeword corresponding to the HARQ information of NACK.

The HARQ information may indicate an ACK signal if all of the multiple-codeword are decoded and indicate a NACK signal if at least one of the multiple-codeword is not decoded and the HARQ information may be received on one PHICH.

The retransmitting includes retransmitting all of the multiple-codeword if the HARQ information indicates the NACK signal.

The multiple-codeword transmission includes two-codeword transmission, and the retransmitting may include swapping layers to which the codewords are mapped upon previous transmission of the two codewords and retransmitting the codewords.

In another aspect of the present invention, there is provided a base station for transmitting downlink hybrid automatic repeat request (HARQ) information in response to uplink multiple-codeword transmission, including a reception module configured to receive an uplink signal from a user equipment (UE), a transmission module configured to transmit a downlink signal to the UE, and a processor configured to control the base station including executing the reception module and the transmission module, wherein the processor is configured to: receive the uplink multiple-codeword via the reception module; generate HARQ information for each of the multiple-codeword based on a result of decoding of each of the multiple-codeword; modulate the HARQ information; and transmit the modulated HARQ information on at least one physical HARQ indicator channel (PHICH) via the transmission module.

In another aspect of the present invention, there is provided a user equipment (UE) for transmitting uplink multiple-codeword using a hybrid automatic repeat request (HARQ), including a reception module configured to receive a downlink signal from a base station, a transmission module configured to transmit an uplink signal to the base station, and a processor configured to execute the transmission module and reception module to transmit the uplink multiple-codeword via the transmission module, receive downlink HARQ information for the uplink multiple-codeword transmission via the reception module and retransmit the multiple-codeword via the transmission module if the HARQ information is a NACK signal, and wherein the HARQ information is generated and modulated based on a result of decoding of each of the multiple-codeword and is received on at least one physical HARQ indicator channel (PHICH).

In another aspect of the present invention, there is provided a method of transmitting downlink control information for scheduling transmission of uplink multiple-codeword, the method including generating downlink control information including modulation and coding scheme (MCS) information and new data indicator (NDI) information for each of the multiple-codeword as uplink scheduling information, and transmitting a physical downlink control channel (PDCCH) including the downlink control information, wherein the downlink control information further includes physical uplink shared channel (PUSCH) resource block allocation information, a transmit power control (TPC) command for a scheduled PUSCH, cyclic shift information for a demodulation reference signal (DMRS), an uplink index in case of time division duplexing (TDD), a downlink allocation index in case of TDD, and channel quality information (CQI) request and precoding information.

The downlink control information may further include at least one of a frequency hopping flag, a resource allocation header, a TPC command for a PUCCH, a transport block-to-codeword swap flag, a carrier indicator and a multi-cluster flag.

Cyclic shift information for the DMRS may be given as a cyclic shift value for of one layer or antenna port, and a cyclic shift value for the other layer or antenna port may be computed according to a predetermined rule based on the cyclic shift value of the one layer or antenna port.

In another aspect of the present invention, there is provided a method of transmitting uplink multiple-codeword scheduled by downlink control information, the method including receiving downlink control information including modulation and coding scheme (MCS) information and new data indicator (NDI) information for each of the multiple-codeword as uplink scheduling information on a physical downlink control channel (PDCCH); determining whether retransmission or not for each of the uplink multiple-codeword based on the NDI information; and transmitting the multiple-codeword based on scheduling information indicated by the downlink control information, wherein the downlink control information further includes physical uplink shared channel (PUSCH) resource block allocation information, a transmit power control (TPC) command for a scheduled PUSCH, cyclic shift information for a demodulation reference signal (DMRS), an uplink index in case of time division duplexing (TDD), a downlink allocation index in case of TDD, and channel quality information (CQI) request and precoding information.

The downlink control information may further include at least one of a frequency hopping flag, a resource allocation header, a TPC command for a PUCCH, a transport block-to-codeword swap flag, a carrier indicator and a multi-cluster flag.

Cyclic shift information for the DMRS may be given as a cyclic shift value for one layer or antenna port, and a cyclic shift value for the other layer or antenna port may be computed according to a predetermined rule based on the cyclic shift value of the one layer or antenna port.

In another aspect of the present invention, there is provided a base station for transmitting downlink control information for scheduling transmission of uplink multiple-codeword, including a reception module configured to receive an uplink signal from a user equipment (UE), a transmission module configured to transmit a downlink signal to the UE, and a processor configured to control the base station including executing the reception module and the transmission module, wherein the processor is configured to generate downlink control information including modulation and coding scheme (MCS) information and new data indicator (NDI) information for each of the multiple-codeword as uplink scheduling information and to transmit a physical downlink control channel (PDCCH) including the downlink control information via the transmission module, and wherein the downlink control information further includes physical uplink shared channel (PUSCH) resource block allocation information, a transmit power control (TPC) command for a scheduled PUSCH, cyclic shift information for a demodulation reference signal (DMRS), an uplink index in case of time division duplexing (TDD), a downlink allocation index in case of TDD, and channel quality information (CQI) request and precoding information.

In another aspect of the present invention, there is provided a user equipment (UE) for transmitting uplink multiple-codeword scheduled by downlink control information, including a reception module configured to receive the downlink control information including modulation and coding scheme (MCS) information and new data indicator (NDI) information for each of the multiple-codeword as uplink scheduling information on a physical downlink control channel (PDCCH) via the reception module; determine whether retransmission or not for each of the uplink multiple-codeword based on the NDI information; and transmit the uplink multiple-codeword based on scheduling information indicated by the downlink control information through the transmission module and a processor configured to execute the transmission module and reception module, and wherein the downlink control information further includes physical uplink shared channel (PUSCH) resource block allocation information, a transmit power control (TPC) command for a scheduled PUSCH, cyclic shift information for a demodulation reference signal (DMRS), an uplink index in case of time division duplexing (TDD), a downlink allocation index in case of TDD, and channel quality information (CQI) request and precoding information.

The above general description and the following detailed description of the present invention are only exemplary and explain the invention of the claims in detail.

Advantageous Effects

According to the embodiments of the present invention, it is possible to efficiently configure control information for data retransmission in transmission of multiple uplink antennas and to provide an accurate and efficient operation for uplink data retransmission.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
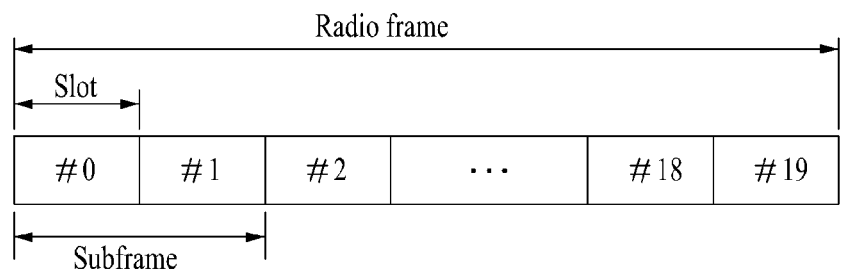
FIG. 1 is a diagram showing the structure of a downlink radio frame.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a user equipment (UE). In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point (AP) as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary. In the present specification, an uplink transmitter may be a UE or a relay and an uplink receiver may be a BS or a relay. Similarly, a downlink transmitter may be a BS or a relay and a downlink receiver may be a UE or a relay. In other words, uplink transmission may mean transmission from a UE to a BS, transmission from a UE to a relay, or transmission from a relay to a BS. Similarly, downlink transmission may mean transmission from a BS to a UE, transmission from a BS to a relay or transmission from a relay to a UE.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A system. However, the technical spirit of the present invention is not limited thereto.

Hereinafter, the structure of a downlink radio frame will be described with reference to FIG. 1.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time division duplexing (TDD).

FIG. 1 is a diagram showing the structure of the type 1 radio frame. A downlink radio frame includes 10 subframes, and one subframe includes two slots in a time domain. A time required to transmit one subframe is defined in a Transmission Time Interval (TTI). For example, one subframe may have a length of 1 ms and one slot may have a length of 0.5 ms. One slot may include a plurality of OFDM symbols in a time domain and include a plurality of Resource Blocks (RBs) in a frequency domain. Since the 3GPP LTE system uses OFDMA in downlink, an OFDM symbol indicates one symbol duration. The OFDM symbol may be called a SC-FDMA symbol or a symbol duration. A RB is a resource allocation unit and includes a plurality of contiguous carriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of the radio frame is only exemplary. Accordingly, the number of subframes included in the radio frame, the number of slots included in the subframe or the number of symbols included in the slot may be changed in various manners.

Figure 2:
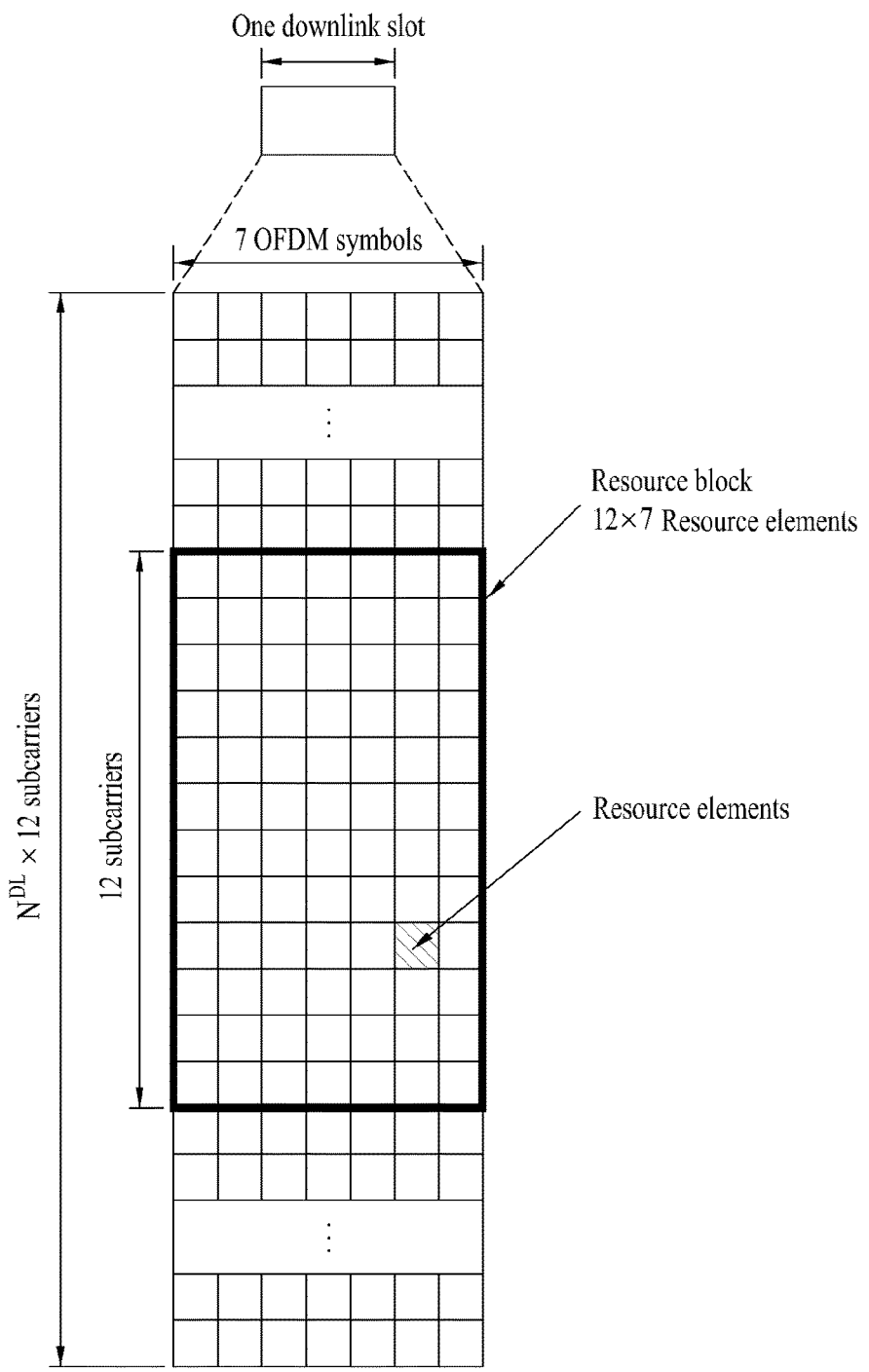
FIG. 2 is a diagram showing an example of a resource grid in one downlink slot.

FIG. 2 is a diagram showing an example of a resource grid in one downlink slot. OFDM symbols are configured by the normal CP. Referring to FIG. 2, the downlink slot includes a plurality of OFDM symbols in a time domain and includes a plurality of RBs in a frequency domain. Although one downlink slot is shown as including seven OFDM symbols and one RB includes 12 subcarriers, the present invention is not limited thereto. Each element of the resource grid is referred to as a Resource Element (RE). For example, a RE a(k,l) is located at a k-th subcarrier and an l-th OFDM symbol. In case of the normal CP, one RB includes 12×7 REs (in case of the extended CP, one RB includes 12×6 REs). Since a gap between subcarriers is 15 kHz, one RB includes about 180 kHz in the frequency domain. $N^{DL}$ denotes the number of RBs included in the downlink slot. The value of $N^{DL}$ is determined based on downlink transmission bandwidth set by scheduling of a base station.

Figure 3:
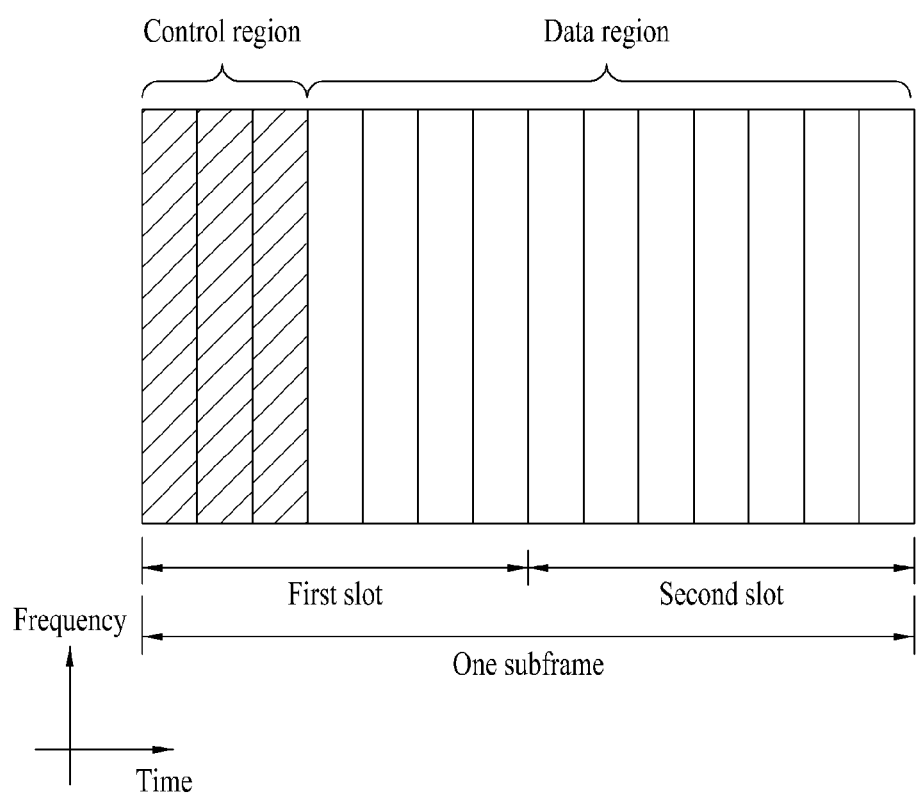
FIG. 3 is a diagram showing the structure of a downlink subframe.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. That is, a PDCCH and a PDSCH are allocated to two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for an arbitrary UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
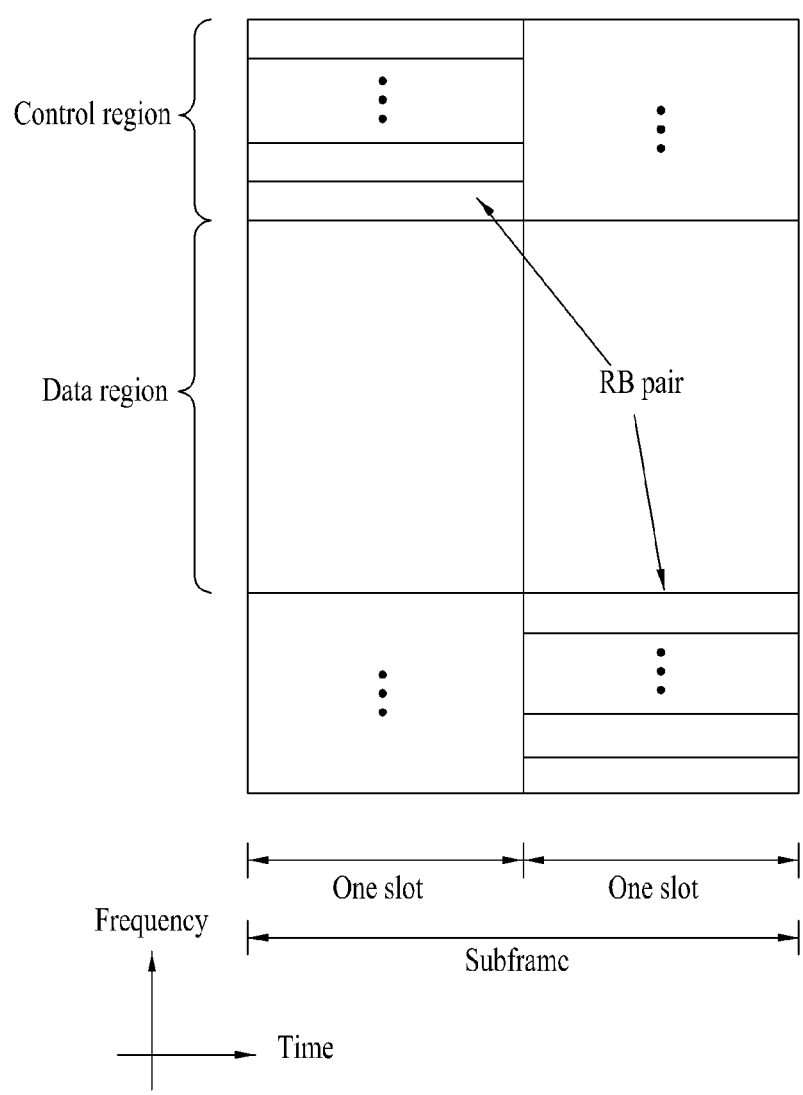
FIG. 4 is a diagram showing the structure of an uplink subframe.

FIG. 4 is a diagram showing the structure of an uplink subframe. The uplink subframe may be divided into a control region and a data region in a frequency domain. A Physical Uplink Control Channel (PUCCH) including uplink control information is allocated to the control region.

A Physical uplink Shared Channel (PUSCH) including user data is allocated to the data region. In order to maintain single carrier characteristics, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot edge.

Carrier Aggregation

In a general radio communication system, only one carrier is mainly considered even when the bandwidths of the uplink and the downlink may be differently set. For example, a radio communication system in which the number of carriers configuring the uplink or the downlink is 1 and the bandwidth of the uplink and the bandwidth of the downlink are generally symmetrical with respect to each other may be provided based on a single carrier.

International Telecommunication Union (ITU) has requested candidate technologies of the IMT-Advanced to support an extended bandwidth, as compared with the existing radio communication system. However, it is difficult to allocate a frequency having a large bandwidth in the whole world excluding some regions. Accordingly, as technologies of efficiently using a plurality of small bands, carrier aggregation, bandwidth aggregation or spectrum aggregation technologies of physically aggregating a plurality of bands in a frequency domain so as to logically obtain the same effect as the use of a large band have been developed.

The carrier aggregation technology is introduced in order to increase throughput, to prevent cost increase due to introduction of a wideband RF element, and to guarantee compatibility with the existing system. The carrier aggregation technology refers to technology of exchanging data between a UE and a BS by aggregating a plurality of carriers in a bandwidth unit defined in the existing radio communication system (e.g., a 3GPP LTE Release 8 or 9 in case of a 3GPP LTE-A system). A carrier of the bandwidth unit defined in the existing radio communication system may be called a Component Carrier (CC) or a cell. Carrier aggregation technology using one or more cells (or CCs) may be applied to the uplink and the downlink. For example, the carrier aggregation technology may include technology of supporting a maximum system bandwidth of 100 MHz by aggregating a maximum of five CCs even when one cell (or CC) supports a bandwidth of 5 MHz, 10 MHz or 20 MHz.

Modeling of Multi-Input Multi-Output (MIMO) System

An MIMO system improves data transmission/reception efficiency using multiple transmission antennas and multiple reception antennas. In the MIMO technology, a single antenna path is not used to receive a whole message, that is, whole data may be received by combining a plurality of pieces of data received through a plurality of antennas.

Figure 5:
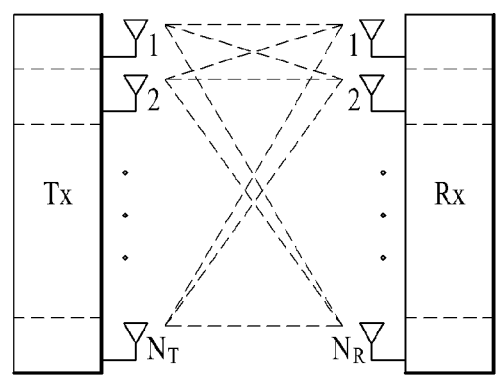
FIG. 5 is a diagram showing the configuration of a wireless communication system having multiple antennas.
Figure 5:
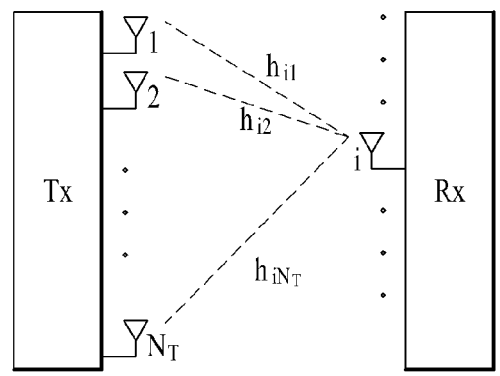

FIG. 5 is a diagram showing the configuration of a wireless communication system having multiple antennas. As shown in FIG. 5(a), if the number of transmission antennas is increased to $N_T$ and the number of reception antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon utilization of a single antenna and a rate increase ratio $R_i$.

$$R_i = \min(N_T, N_R) \quad \text{Equation 1}$$

For example, in an MIMO system using four transmission antennas and four reception antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the multiple antenna technology up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmission antennas and $N_R$ reception antennas are present.

In transmitted signals, if the $N_T$ transmission antennas are present, the number of pieces of maximally transmittable information is $N_T$. The transmitted information may be expressed as follows.

$$s = [s_1, s_2, \ldots, s_{N_T}]^T \quad \text{Equation 2}$$

The transmitted information $S_1, S_2, \ldots, S_{N_T}$ may have different transmit powers. If the respective transmit powers are $P_1, P_2, \ldots, P_{N_T}$, the transmitted information with adjusted powers may be expressed as follows.

$$\hat{s}[\hat{s}_1, \hat{s}_2, \ldots, \hat{s}_{N_T}]^T = [P_1 s_1, P_2 s_2, \ldots, P_{N_T} s_{N_T}]^T \quad \text{Equation 3}$$

In addition, $\hat{S}$ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Considers that the $N_T$ actually transmitted signals $x_1, x_2, \ldots, x_{N_T}$ are configured by applying a weight matrix W to the information vector S with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{Equation 5}$$

where, $W_{ij}$ denotes a weight between an i-th transmission antenna and j-th information. W is also called a precoding matrix.

The transmitted signal x may be differently processed according to two schemes (for example, a spatial diversity scheme and a spatial multiplexing scheme). In case of the spatial multiplexing scheme, different signals are multiplexed and the multiplexed signal is transmitted to a receiver such that elements of information vector(s) have different values. In case of the spatial diversity scheme, the same signal is repeatedly transmitted through a plurality of channel paths such that elements of information vector(s) have the same value. A combination of the spatial multiplexing scheme and the spatial diversity scheme may be considered. That is, the same signal may be, for example, transmitted through three transmission antennas according to the spatial diversity scheme and the remaining signals may be transmitted to the receiver using the spatial multiplexing scheme.

If the $N_R$ reception antennas are present, respective received signals $y_1, y_2, \ldots, y_{N_R}$ of the antennas are expressed as follows.

$$y = [y_1, y_2, \ldots, y_{N_R}]^T \qquad \text{Equation 6}$$

If channels are modeled in the MIMO radio communication system, the channels may be distinguished according to transmission/reception antenna indexes. A channel from the transmission antenna j to the reception antenna i is denoted by $h_{ij}$. In $h_{ij}$, it is noted that the indexes of the reception antennas precede the indexes of the transmission antennas in view of the order of indexes.

FIG. 5(b) is a diagram showing channels from the $N_T$ transmission antennas to the reception antenna i. The channels may be combined and expressed in the form of a vector and a matrix. In FIG. 5(b), the channels from the $N_T$ transmission antennas to the reception antenna i may be expressed as follows.

$$h_i^T = [h_{i1}, h_{i2}, \ldots, h_{iN_T}] \qquad \text{Equation 7}$$

Accordingly, all the channels from the $N_T$ transmission antennas to the $N_R$ reception antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & & h_{N_R N_T} \end{bmatrix} \qquad \text{Equation 8}$$

An Additive White Gaussian Noise (AWGN) is added to the actual channels after a channel matrix H. The AWGN $n_1$, $n_2, \ldots, n_{N_R}$ added to the $N_T$ transmission antennas may be expressed as follows.

$$n = [n_1, n_2, \ldots, n_{N_R}]^T \qquad \text{Equation 9}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{Equation 10}$$

$$Hx + n$$

The number of rows and columns of the channel matrix H indicating the channel state is determined by the number of transmission and reception antennas. The number of rows of the channel matrix H is equal to the number $N_R$ of reception antennas and the number of columns thereof is equal to the number $N_T$ of transmission antennas. That is, the channel matrix H is an $N_R \times N_T$ matrix.

The rank of the matrix is defined by the smaller of the number of rows or columns, which is independent from each other. Accordingly, the rank of the matrix is not greater than the number of rows or columns. The rank rank(H) of the channel matrix H is restricted as follows.

$$\text{rank}(H) \leq \min(N_T, N_R) \qquad \text{Equation 11}$$

In MIMO transmission, the term "rank" denotes the number of paths for independently transmitting signals, and the term "number of layers" denotes the number of signal streams transmitted through each path. In general, since a transmitter transmits layers corresponding in number to the number of ranks used for signal transmission, the rank has the same meaning as the number of layers unless otherwise noted.

Hybrid Automatic Repeat Request (HARQ)

As a control method of data reception failure, the following HARQ operation may be applied. A data transmitter may transmit a new packet if an ACK signal is received from a receiver and retransmit the transmitted packet if a NACK signal is received, after transmitting one packet. At this time, the packet subjected to coding with forward error correction (FEC) may be retransmitted. Accordingly, the data receiver receives and decodes one packet, transmits an ACK signal if decoding is successfully performed, transmits a NACK signal if decoding fails, and stores the received packet in a buffer. If the data receiver receives the retransmitted packet due to the NACK signal, the data receiver decodes the retransmitted packet in association with the packet stored in the buffer, thereby increasing a packet reception success rate.

The HARQ scheme may be divided into a synchronous HARQ scheme and an asynchronous HARQ scheme according to retransmission timings. In the synchronous HARQ scheme, if initial transmission fails, subsequent retransmission is performed at a predetermined time set by a system. For example, if retransmission is set to be performed in every fourth time unit after initial transmission fails, information about a retransmission time does not need to be signaled to the receiver. Accordingly, if the data transmitter receives the NACK signal, the packet is retransmitted in every fourth time unit until the ACK signal is received. According to the asynchronous HARQ scheme, information about a retransmission time is separately scheduled. Accordingly, the retransmission time of the packet corresponding to the NACK signal may be changed according to various factors such as channel state.

The HARQ scheme may be divided into an adaptive HARQ scheme and a non-adaptive HARQ scheme depending on whether the amount of resources used for retransmission is set according to a channel state. In the non-adaptive scheme, a packet modulation scheme, the number of used RBs, etc., which are used upon retransmission, are set in advance upon initial transmission. For example, if a transmitter transmits data using eight RBs upon initial transmission, the transmitter also retransmits data using eight RBs even upon retransmission. In contrast, in the adaptive scheme, the packet modulation scheme, the number of used RBs, etc. may be changed according to channel state. For example, even when data is transmitted using eight RBs upon initial transmission, retransmission may be performed using RBs of a number of less than or greater than eight RBs according to channel state.

A synchronous HARQ scheme is applicable to uplink data transmission of a UE having a single antenna. A HARQ ACK/NACK signal for uplink data transmission is indicated via a PHICH or a PDCCH among downlink control channels. The non-adaptive HARQ scheme may be performed if the PHICH is used and the adaptive HARQ scheme may be performed if the PDCCH is used.

The PHICH is used to transmit 1-bit ACK/NACK information, a bit state 0 means ACK and a bit state 1 means NACK. The 1-bit information is modulated using a binary phase shift keying (BPSK) scheme. The non-adaptive scheme is performed if the PHICH is used and a redundancy version (RV) may be changed according to a predetermined pattern.

The PDCCH is a channel including control information for uplink/downlink data transmission. A UE may acquire uplink control information so as to perform uplink data transmission. Downlink control information (DCI) for scheduling uplink transmission may be referred to as uplink (UL) grant. Such control information may include resource allocation information, a modulation and coding scheme (MCS) level, a new data indicator (NDI), power control information, etc. The NDI has a size of 1 bit and has a bit state different from a previous NDI bit state if data to be transmitted is new data. That is, the NDI value is toggled. In case of retransmission, control information having the same bit state as the NDI bit of previous control is transmitted. That is, the NDI value is not toggled. Since the MCS is indicated through the PDCCH, an adaptive HARQ scheme is possible.

In the 3GPP LTE system, an uplink HARQ scheme is defined as a synchronous HARQ scheme and a maximum number of retransmissions is configured per UE. A downlink ACK/NACK signal responding to uplink transmission/retransmission is transmitted on a PHICH. An uplink HARQ operation follows the following rule.

1) If a PDCCH indicating a C-RNTI of a UE is accurately received regardless of content of HARQ feedback (ACK or NACK), a UE may perform an operation indicated by the PDCCH, that is, transmission or retransmission (this may be referred to as adaptive retransmission).

2) If a PDCCH indicating a C-RNTI of a UE is not detected, HARQ feedback may indicate a method of performing retransmission by a UE. If HARQ feedback is NACK, the UE performs non-adaptive retransmission. That is, retransmission is performed using the same uplink resources as those previously used by the same HARQ process. If HARQ feedback is ACK, the UE does not perform uplink transmission/retransmission and keeps data in a HARQ buffer. In order to perform retransmission, indication through a PDCCH is required. That is, non-adaptive retransmission is not performed.

Meanwhile a measurement gap has higher priority than HARQ retransmission. That is, if HARQ retransmission collides with measurement gap, HARQ retransmission is not performed.

The above-described uplink HARQ operation is summarized as shown in Table 1.

TABLE 1

| HARQ feedback received by UE | PDCCH received by UE | UE Operation |
|---|---|---|
| ACK or NACK | New transmission | New transmission is performed according to the PDCCH |
| ACK or NACK | Retransmission | Retransmission is performed according to the PDCCH (adaptive retransmission) |
| ACK | None | Transmission/retransmission is not performed and data is kept in the HARQ buffer. The PDCCH is required to resume retransmission. |
| NACK | None | Non-adaptive retransmission |

For detailed description of the uplink HARQ operation, refer to the 3GPP LTE standard (e.g., 3GPP TS 36.300 V8.6.0).

In the conventional 3GPP LTE system (e.g., the 3GPP LTE release 8 system), if a multiple antenna transmission scheme is applied to uplink signal transmission from a UE to a BS, a peak-to-average ratio (PAPR)/cubic metric is deteriorated. Thus, a multiple antenna transmission scheme is defined only in downlink signal transmission from a BS to a UE. Application of a multiple antenna transmission scheme to an uplink signal transmitted from a UE to a BS has been discussed for increase in transfer rate and acquisition of diversity gain, and a method of applying a multiple antenna transmission scheme to uplink signal transmission in the subsequent standard (e.g., 3GPP LTE-A) of the 3GPP LTE system has been discussed.

In application of the multiple antenna transmission scheme to uplink signal transmission, an uplink transmitter (e.g., a UE) may have two or four transmission antennas. In order to reduce overhead of a control signal, a maximum of two codewords may be transmitted in uplink. In a system for transmitting multiple codewords in uplink, an uplink receiver (e.g., a BS) needs to inform the uplink transmitter (e.g., a UE) of detection (or decoding) success/failure of the codewords. The uplink receiver may transmit a HARQ ACK/NACK signal of each codeword to the uplink transmitter. With respect to uplink transmission of two codewords, a determination as to whether new data transmission or retransmission is performed depending on whether downlink HARQ feedback received by the uplink transmitter is ACK or NACK may be defined as shown in Table 2.

In a non-blank operation, new data is transmitted with respect to a codeword for which ACK is received and retransmission is performed with respect to a codeword for which NACK is received. Meanwhile, in a blanking operation, new data is transmitted with respect to two codewords if ACK is received with respect to the two codewords, and a codeword for which ACK is received is not transmitted and a codeword for which NACK is received is retransmitted if ACK is received with respect to one of the two codewords and NACK is received with respect to the other of the two codewords. If NACK is received with respect to the two codewords, the two codewords are retransmitted.

TABLE 2

| First codeword | Second codeword | Operation (non-blanking) | Operation (blanking) |
|---|---|---|---|
| ACK | ACK | First codeword: new data transmission Second codeword: new data transmission | First codeword: new data transmission Second codeword: new data transmission |
| ACK | NACK | First codeword: new data transmission Second codeword: retransmission | First codeword: non-transmission/retransmission Second codeword: retransmission |
| NACK | ACK | First codeword: retransmission Second codeword: new data transmission | First codeword: retransmission Second codeword: non-transmission/retransmission |
| NACK | NACK | First codeword: retransmission Second codeword: retransmission | First codeword: retransmission Second codeword: retransmission |

Hereinafter, in a HARQ operation for the above-described uplink multi-codeword transmission, various embodiments of the present invention of a method of configuring control information on a PHICH, a method of performing retransmission by a UE which receives a PHICH and a method of configuring downlink control information (DCI) on a PDCCH will be described.

Method of Configuring Control Information on a PHICH for Multiple Uplink Codeword HARQ Retransmission As described above, a HARQ scheme for uplink data transmission is synchronously performed and a PHICH including HARQ ACK/NACK control information for uplink data transmission is transmitted after a predetermined time according to an uplink data transmission period. An uplink transmitter may determine uplink data retransmission according to an ACK/NACK state indicated by the PHICH. The ACK/NACK state is represented by 1 bit and this information is transmitted on a PHICH after modulation and encoding or modulation and sequence mapping.

Multiple codewords may be used for uplink data transmission. Multiple codewords may be used for the above-described multiple antenna transmission scheme. Alternatively, multiple codewords may be used for a multiple carrier technique (or a carrier aggregation technique). In the present specification, multi-codeword transmission is applicable to a multiple antenna transmission scheme or a multiple carrier technique.

Since 1 bit of information is required to indicate an ACK/NACK state of one codeword, N bits of information is required to indicate ACK/NACK states of N codewords. For example, in a system having two codewords, a total of 2 bits is required to indicate the ACK/NACK states of the codewords. N-bit information may be transmitted on a PHICH using various methods.

In a first embodiment, ACK/NACK signals for multiple codewords may be modulated using a modulation method having an order higher than that of a conventional BPSK modulation method. For example, ACK/NACK signals of two codewords may be represented by 2 bits and 2 bits may be modulated using a quadrature phase shift keying (QPSK) scheme. When more bits are required to represent the ACK/NACK states as in transmission of two or more codewords, a modulation scheme such as N-PSK or N-Quadrature amplitude modulation (QAM) may be utilized. If a QPSK scheme is used, points of a total of four states may be represented by 1+j, 1−j, −1−j and −1+j. Alternatively, QPSK may be represented by 1, −1, j and −j. In the QPSK scheme, each point may be subjected to power normalization.

In a second embodiment, ACK/NACK signals for multiple codewords may be transmitted on multiple PHICHs. Each PHICH may include 1 bit of ACK/NACK information of one codeword. For example, with respect to two codewords, ACK/NACK information may be transmitted on two PHICHs.

In a third embodiment, ACK/NACK signals for multiple codewords may be represented by 1 bit on one PHICH. For example, if two codewords are successfully decoded, ACK is transmitted and, if decoding of any one of the two codewords fails, NACK is transmitted.

Method of Performing Multiple Uplink Codeword HARQ Retransmission according to PHICH In a first embodiment, if multiple PHICHs are transmitted with respect to transmission of multiple uplink codewords, a retransmission operation according to an ACK/NACK state of each codeword may be defined as shown in Table 3. An uplink transmitter (e.g., a UE) performs retransmission only with respect to a codeword for which NACK is received and does not retransmit a codeword for which ACK is received. If ACK is received with respect to the two codewords, the two codewords are not transmitted.

In a second embodiment, if a single PHICH is transmitted with respect to transmission of multiple uplink codewords (ACK is transmitted if two codewords are successfully decoded and NACK is transmitted if decoding of one or more of the two codewords fails), a retransmission operation according to an ACK/NACK state may be defined as shown Table 4.

TABLE 3

| First codeword | Second codeword | Uplink transmitter Operation |
|---|---|---|
| ACK | ACK | First codeword: non-transmission/retransmission (PDCCH is required to resume retransmission) Second codeword: non-transmission/retransmission (PDCCH is required to resume retransmission) |
| ACK | NACK | First codeword: non-transmission/retransmission (PDCCH is required to resume retransmission) Second codeword: retransmission (non-adaptive) |
| NACK | ACK | First codeword: retransmission (non-adaptive) Second codeword: non-transmission/retransmission (PDCCH is required to resume retransmission |
| NACK | NACK | First codeword: retransmission (non-adaptive) Second codeword: retransmission (non-adaptive) |

TABLE 4

| First and second codewords | Uplink transmitter Operation |
|---|---|
| ACK | First codeword: non-transmission/retransmission (PDCCH is required to resume retransmission) Second codeword: non-transmission/retransmission (PDCCH is required to resume retransmission) |
| NACK | First codeword: retransmission (non-adaptive) Second codeword: retransmission (non-adaptive) |

In a third embodiment, if a single PHICH is transmitted with respect to transmission of multiple uplink codewords (ACK is transmitted if two codewords are successfully decoded and NACK is transmitted if decoding of one or more of the two codewords fails), a retransmission operation according to an ACK/NACK state may be defined as shown Table 5. The order of layers to which two codewords are mapped may be swapped upon retransmission. For example, swapping of codeword-to-layer mapping may be defined as shown in Table 6.

If the layers to which the codewords are mapped are swapped upon retransmission, a codeword decoding success rate can be increased. For example, if a first codeword is transmitted via a first layer and a second codeword is transmitted via a second layer upon first transmission, the channel state of the first layer may be better than that of the second layer and thus the first codeword may be successfully decoded, but decoding of the second codeword may fail. In this case, if codeword-to-layer mapping is not swapped upon retransmission, the second codeword is transmitted via the second layer having a worse channel state and thus decoding of the second codeword may fail. In contrast, if codeword-to-layer mapping is swapped upon retransmission, the second codeword is transmitted via the first layer having a better channel state and a decoding success rate of the second codeword can be increased.

TABLE 5

| First and second codewords | Uplink transmitter Operation |
|---|---|
| ACK | First codeword: non-transmission/retransmission (PDCCH is required to resume retransmission) Second codeword: non-transmission/retransmission (PDCCH is required to resume retransmission) |
| NACK | First codeword: retransmission (non-adaptive) swapping of codeword-to-layer mapping Second codeword: retransmission (non-adaptive) swapping of codeword-to-layer mapping |

TABLE 6

|  | First codeword | Second codeword |
|---|---|---|
| First transmission | First layer | Second layer |
| Second transmission | Second layer | First layer |
| Third transmission | First layer | Second layer |
| Fourth transmission | Second layer | First layer |

Method of Configuring PDCCH DCI for Multiple Uplink Codeword HARQ Retransmission In a conventional 3GPP LTE system, a single codeword is transmitted in uplink transmission and uplink scheduling information thereof may be given via a PDCCH having DCI format 0. The existing DCI format 0 may be defined as shown in Table 7.

TABLE 7

| Format 0 | |
|---|---|
| Contents | Number of bit |
| Flag for format 0/format 1A differentiation | 1 bit |
| Hopping flag | 1 bit |
| Resource block assignment and hopping resource allocation | N bits |
| Modulation and coding scheme and redundancy version | 5 bits |
| New data indicator | 1 bit |
| TPC command for scheduled PUSCH | 2 bits |
| Cyclic shift for DMRS | 3 bits |

TABLE 7-continued

| Format 0 | |
|---|---|
| Contents | Number of bit |
| UL index (for TDD) | 2 bits |
| Downlink Assignment Index (for TDD) | 2 bits |
| CQI request | 1 bit |

In DCI format 0, a "Flag for format 0/format 1A differentiation" field is a field for differentiating between DCI format 0 and DCI format 1A. Since DCI format 1A is a DCI format for scheduling downlink transmission and has the same payload size as DCI format 0, a field for differentiating between DCI format 0 and DCI format 1A is included while DCI format 0 and DCI format 1A have the same format. The "Flag for format 0/format 1A differentiation" field having a value of 0 indicates DCI format 0 and the "Flag for format 0/format 1A differentiation" field having a value of 1 indicates DCI format 1A.

A "Hopping flag" (frequency hopping flag) field indicates whether PUSCH frequency hopping is applied. The "Hopping flag" field having a value of 0 indicates that PUSCH frequency hopping is not applied and the "Hopping flag" field having a value of 1 indicates that PUSCH frequency hopping is applied.

A "Resource block assignment and hopping resource allocation" field indicates resource block assignment information of an uplink subframe depending on whether PUSCH frequency hopping is applied.

A "Modulation and coding scheme and redundancy version" field indicates a modulation order and a redundancy version (RV) of a PUSCH. The RV indicates information about which subpacket is retransmitted in case of retransmission. Among 32 states represented by 5 bits, 0 to 28 may be used to indicate modulation order and 29 to 31 may be used to indicate RV indexes 1, 2 and 3.

A "New data indicator" field indicates whether uplink scheduling information is for new data or retransmitted data. If the value of this field is toggled from an NDI value of previous transmission, this indicates that new data is transmitted and, if the value of this field is not toggled from an NDI value of previous transmission, this indicates that data is retransmitted.

A "TPC command for scheduled PUSCH" field indicates a value for deciding transmit power of PUSCH transmission.

A "Cyclic shift for DMRS" field is a cyclic shift value used to generate a sequence for a demodulation reference signal (DMRS). The DMRS is a reference signal used to estimate an uplink channel per antenna port or layer.

A "UL index (for TDD)" field may indicate a subframe index set to uplink transmission in a specific uplink-downlink configuration if a radio frame is configured using a time division duplexing (TDD) scheme.

A "Downlink Assignment Index (for TDD)" field may indicate a total number of subframes set to PDSCH transmission in a specific uplink-downlink configuration if a radio frame is configured using a TDD scheme.

A "channel quality indicator (CQI) request" field indicates a request for reporting a periodic channel quality information (CQI), a precoding matrix indicator (PMI) and a rank indicator (RI) using a PUSCH. If the "CQI request" field is set to 1, a UE transmits a report for a periodic CQI, PMI and RI using a PUSCH.

Meanwhile, a PDCCH of DCI format 2 for scheduling transmission of multiple downlink codewords may include control information shown in Table 8.

TABLE 8

Format 2

| Contents | Number of bit |
|---|---|
| Resource allocation header (resource allocation type0/type 1) | 1 bit |
| Resource block assignment | N bits |
| TPC command for PUCCH | 2 bits |
| Downlink Assignment Index (for TDD) | 2 bits |
| HARQ process number | 3 bits(FDD), 4 bits(TDD) |
| Transport block to codeword swap flag | 1 bit |
| For $1^{st}$ codeword  Modulation and coding scheme | 5 bits |
| New data indicator | 1 bit |
| Redundancy version | 2 bits |
| For $2^{nd}$ codeword  Modulation and coding scheme | 5 bits |
| New data indicator | 1 bit |
| Redundancy version | 2 bits |
| Precoding information | 3 bits (2 transmit antenna at eNode-B) 6 bits (4 transmit antenna at eNode-B) |

In DCI format 2, a "Resource allocation header (resource allocation type 0/type 1)" field having a value of 0 indicates resource allocation of Type 0 and a "Resource allocation header (resource allocation type 0/type 1)" field having a value of 1 indicates resource allocation of Type 1. Resource allocation of Type 0 may indicate that resource block groups (RBGs) allocated to a scheduled UE are a set of contiguous physical resource blocks (PRBs). Resource allocation of Type 1 may indicate physical resource blocks allocated to a scheduled UE in a set of physical resource blocks of one RBG selected from a subset of a predetermined number of RBGs.

A "Resource block assignment" field indicates a resource block allocated to a scheduled UE according to resource assignment of Type 0 or Type 1.

A "TPC command for PUCCH" field indicates a value for deciding transmit power of PUCCH transmission.

A "Downlink Assignment Index (for TDD)" field may indicate a total number of subframes set to PDSCH transmission in a specific uplink-downlink configuration if a radio frame is configured using a TDD scheme.

A "HARQ process number" field may indicate which of a plurality of HARQ processes managed by a HARQ entity is used for transmission.

A "Transport block to codeword swap flag" field indicates a transport block-to-codeword mapping relationship if two transport blocks are enabled. If the "Transport block to codeword swap flag" field has a value of 0, this indicates that a transport block 1 is mapped to a codeword 0 and a transport block 2 is mapped to a codeword 1, and, if the "Transport block to codeword swap flag" field has a value of 1, this indicates that a transport block 2 is mapped to a codeword 0 and a transport block 1 is mapped to a codeword 1.

In DCI format 2, a "Modulation and coding scheme" field, a "New data indicator" field and a "redundancy version" field are defined with respect to a first codeword and a second codeword. The "Modulation and coding scheme" field indicates a modulation order of a PUSCH. The "New data indicator" field indicates whether downlink scheduling information is new data or retransmitted data. The "Redundancy version" field indicates information about which subpacket is retransmitted in case of retransmission.

A "precoding information" field may indicate a codebook index for precoding of downlink transmission. If a BS includes two transmission antennas, 3 bits are necessary to indicate codebook indexes of Rank 1 and Rank 2 and six bits are necessary to indicate codebook indexes of Ranks 1, 2, 3 and 4.

As described above with reference to Tables 7 and 8, in the existing 3GPP LTE system, DCI format 0 for transmission of a single uplink codeword and DCI format 2 for transmission of multiple downlink codewords are defined and a PDCCH DCI format for transmission of multiple uplink codewords is not defined.

In the present invention, examples of a new DCI format for transmission of multiple uplink codewords (uplink grant via a PDCCH) are proposed as shown in Tables 9, 10 and 11.

Table 9 shows an example of a new DCI format used to schedule a PUSCH in a multiple antenna port transmission mode in one uplink cell (or one component carrier). Although DCI "Format 0—for MIMO" is shown in Table 9, a DCI format defined in Table 9 may be referred to as a format index (e.g., DCI format 4) for differentiation from the previously defined DCI format.

A "Hopping flag" (frequency hopping flag) field may indicate whether PUSCH frequency hopping is applied. The "Hopping flag" field may be defined if contiguous resource assignment is applied to a PUSCH and may be omitted if non-contiguous resource assignment is applied to a PUSCH.

TABLE 9

Format 0 - for MIMO

| Contents | Number of bit |
|---|---|
| Hopping flag | 1 bit |
| Resource block assignment and hopping resource allocation | N bits |
| TPC command for scheduled PUSCH | 2 bits |
| Cyclic shift for DMRS | 3 bits |
| UL index (for TDD) | 2 bits |
| Downlink Assignment Index (for TDD) | 2 bits |
| CQI request | 1 bit |
| Resource allocation header (resource allocation type0/type 1) | 1 bit |
| TPC command for PUCCH | 2 bits |
| Transport block to codeword swap flag | 1 bit |
| For $1^{st}$ codeword  Modulation and coding scheme | 5 bits |
| New data indicator | 1 bit |
| For $2^{nd}$ codeword  Modulation and coding scheme | 5 bits |
| New data indicator | 1 bit |
| Precoding information | 3 bits (2 transmit antenna) 6 bits (4 transmit antenna) |

A "Resource block assignment and hopping resource allocation" field may indicate resource block assignment information of an uplink subframe depending on whether PUSCH frequency hopping is applied or single cluster assignment or multiple cluster assignment is applied.

A "TPC command for scheduled PUSCH" field indicates a value for deciding transmit power of PUSCH transmission. The "TPC command for scheduled PUSCH" field may be defined by 2 bits if an uplink transmitter (e.g., a UE)—specific transmit power control (TPC) command is given. Alternatively, if a TPC command is given with respect to each of a plurality of antennas, the "TPC command for scheduled PUSCH" field may be defined by a bit size of 2 bits x the number of antennas. A TPC command may be given with respect to each of two codewords and, in this case, the "TPC command for scheduled PUSCH" field may be defined by a size of 4 bits.

A "Cyclic shift for DMRS" field is a cyclic shift value used to generate a sequence for a demodulation reference signal (DMRS). The "Cyclic shift for DMRS" field may include an orthogonal cover code (OCC) index used to additionally generate a DMRS. A cyclic shift value of one layer (or one antenna port) may be given by the "Cyclic shift for DMRS" field. A cyclic shift value of another layer (or another antenna port) may be computed from the cyclic shift value given according to a predetermined rule based on the above layer (or antenna port).

A "UL index (for TDD)" field may indicate a subframe index set to uplink transmission in a specific uplink-downlink configuration if a radio frame is configured using a time division duplexing (TDD) scheme.

A "Downlink Assignment Index (for TDD)" field may indicate a total number of subframes set to PDSCH transmission in a specific uplink-downlink configuration if a radio frame is configured using a TDD scheme.

A "channel quality information (CQI) request" field indicates a request for reporting a periodic CQI, a precoding matrix indicator (PMI) and a rank indicator (RI) using a PUSCH.

A "Resource allocation header (resource allocation type 0/type 1)" field may indicate resource allocation of Type 0 or Type 1. Type 0 may indicate contiguous resource allocation and Type 1 may indicate a variety of other forms of resource allocation. For example, Type 1 may indicate non-contiguous resource allocation. If a PUSCH resource allocation scheme is indicated via explicit or implicit signaling, the "Resource allocation header (resource allocation type 0/type 1)" field may be omitted.

A "TPC command for PUCCH" field may indicate a value for deciding transmit power of PUCCH transmission and may be omitted in some cases.

A "Transport block to codeword swap flag" field indicates a transport block-to-codeword mapping relationship if two transport blocks are enabled. If the "Transport block to codeword swap flag" field has a value of 0, this indicates that a transport block 1 is mapped to a codeword 0 and a transport block 2 is mapped to a codeword 1, and, if the "Transport block to codeword swap flag" field has a value of 1, this indicates that a transport block 2 is mapped to a codeword 0 and a transport block 1 is mapped to a codeword 1. If one of the two codewords is disabled, the "Transport block to codeword swap flag" field is reserved. Alternatively, if transport block to codeword swapping is not supported, the "Transport block to codeword swap flag" field may be omitted.

A "Modulation and coding scheme" and a "new data indicator" field may be defined with respect to two codewords (or transport blocks).

A "Modulation and coding scheme" field indicates a modulation order of each codeword (or each transport block). Some bit states of the "Modulation and coding scheme" field may be used to indicate RV information of each codeword (or each transport block). The RV may indicate information about which subpacket is retransmitted in case of retransmission of each codeword (or each transport block).

A "New data indicator" field indicates whether uplink scheduling information of each codeword (or each transport block) is new data or retransmitted data. If the value of this field is toggled from an NDI value of previous transmission of the codeword (or the transport block), this indicates that new data is transmitted and, if the value of this field is not toggled from an NDI value of previous transmission of the codeword (or the transport block), this indicates that data is retransmitted.

A "precoding information" field may indicate a codebook index for precoding of downlink transmission. If an uplink transmitter (e.g., a UE) includes two transmission antennas, the "precoding information" field may be defined by 3 bits in order to indicate codebook indexes of Rank 1 and Rank 2 and, if an uplink transmitter (e.g., a UE) includes four transmission antennas, the "precoding information" field may be defined by 6 bits in order to indicate codebook indexes of Rank 1, 2, 3 and 4.

Table 10 shows another example of a new DCI format used to schedule a PUSCH in a multiple antenna port transmission mode in one uplink cell (or one component carrier). Although DCI "Format 0A" is shown in Table 10, a DCI format defined in Table 10 may be referred to as a format index (e.g., DCI format 4) for differentiation from the previously defined DCI format.

Among the fields defined in the DCI format of Table 10, a description of the same fields as those of the DCI format of Table 9 will be omitted for clarity of description.

In the DCI format of Table 10, a "Cyclic shift for DMRS" field may indicate a cyclic shift value used to generate a sequence for an uplink DMRS. The "Cyclic shift for DMRS" field may include an OCC index used to additionally generate a DMRS. By the "Cyclic shift for DMRS" field, cyclic shift values of a plurality of layers (or antenna ports) may be explicitly given. For example, one cyclic shift value may be represented by 3 bits and the "Cyclic shift for DMRS" field may be defined by a size of 12 bits in order to indicate the respective cyclic shift values of four layers (or four antenna ports).

TABLE 10

| Format 0A | |
|---|---|
| Contents | Number of bit |
| Resource allocation header (resource allocation type0/type 1) | 1 bit |
| Hopping flag | 1 bit |
| Resource block assignment and hopping resource allocation | N bits |
| TPC command for scheduled PUSCH | 2 bits |
| Cyclic shift for DMRS | 3 bits + N(0~3) bits |
| TPC command for PUCCH | 2 bits |
| Transport block to codeword swap flag | 1 bit |
| For 1$^{st}$ codeword    Modulation and coding scheme | 5 bits |
| New data indicator | 1 bit |
| For 2$^{nd}$ codeword    Modulation and coding scheme | 5 bits |
| New data indicator | 1 bit |
| Precoding information | 3 bits (2 transmit antenna) 6 bits (4 transmit antenna) |
| CQI request | 1 bit |
| UL index (for TDD) | 2 bits |
| Downlink Assignment Index (for TDD) | 2 bits |

The remaining fields of the DCI format of Table 10 are equal to those of the DCI format of Table 9.

Table 11 shows another example of a new DCI format used to schedule a PUSCH in a multiple antenna port transmission mode in one uplink cell (or one component carrier). Although DCI "Format 0B" is shown in Table 11, a DCI format defined in Table 11 may be referred to as a format index (e.g., DCI format 4) for differentiation from the previously defined DCI format.

Among the fields defined in the DCI format of Table 11, a description of the same fields as those of the DCI format of Table 9 will be omitted for clarity of description.

TABLE 11

Format 0B

| Contents | Number of bit |
|---|---|
| Resource allocation header (resource allocation type0/type 1) | 1 bit |
| Hopping flag | 1 bit |
| Resource block assignment and hopping resource allocation | N bits |
| TPC command for scheduled PUSCH | 2 bits |
| Cyclic shift for DMRS | 3 bits + N(0~3) bits |
| TPC command for PUCCH | 2 bits |
| New data indicator | 1 bit |
| Transport block to codeword swap flag | 1 bit |
| Modulation and coding scheme for $1^{st}$ codeword | 5 bits |
| Modulation and coding scheme for $2^{nd}$ codeword | 5 bits |
| Precoding information | 3 bits (2 transmit antenna) 6 bits (4 transmit antenna) |
| CQI request | 1 bit |
| UL index (for TDD) | 2 bits |
| Downlink Assignment Index (for TDD) | 2 bits |

In the DCI format of Table 11, a "Cyclic shift for DMRS" field may indicate a cyclic shift value used to generate a sequence for an uplink DMRS. The "Cyclic shift for DMRS" field may include an OCC index used to additionally generate a DMRS. By the "Cyclic shift for DMRS" field, cyclic shift values of a plurality of layers (or antenna ports) may be explicitly given. For example, one cyclic shift value may be represented by 3 bits and the "Cyclic shift for DMRS" field may be defined by a size of 12 bits in order to indicate the respective cyclic shift values of four layers (or four antenna ports).

While the "New data indicator" fields of the codewords are defined in the DCI format of Table 9 or 10, only one "New data indicator" field may be defined with respect to two codewords in the DCI format of Table 11. That is, two codewords (or two transport blocks) are bundled to indicate whether uplink scheduling information is for new data or retransmitted data. If the value of this field is toggled from an NDI value of previous transmission, the two codewords (or two transport blocks) indicate new data transmission and, if the value of this field is not toggled from an NDI value of previous transmission, the two codewords (or two transport blocks) indicate retransmission.

The remaining fields of the DCI format of Table 11 are equal to those of the DCI format of Table 9.

In the DCI formats of Tables 9, 10 and 11, a "Carrier Indicator" field and a "Multi-cluster flag" field may be additionally defined. The "Carrier Indicator" field may indicate in which uplink cell (or component carrier) multiple codeword PUSCH transmission is scheduled if one or more uplink cells (or one or more component carriers) are present and may be represented by 0 or 3 bits. The "Multi-cluster flag" field may indicate whether multi-cluster allocation is applied in terms of uplink resource allocation.

Figure 6:
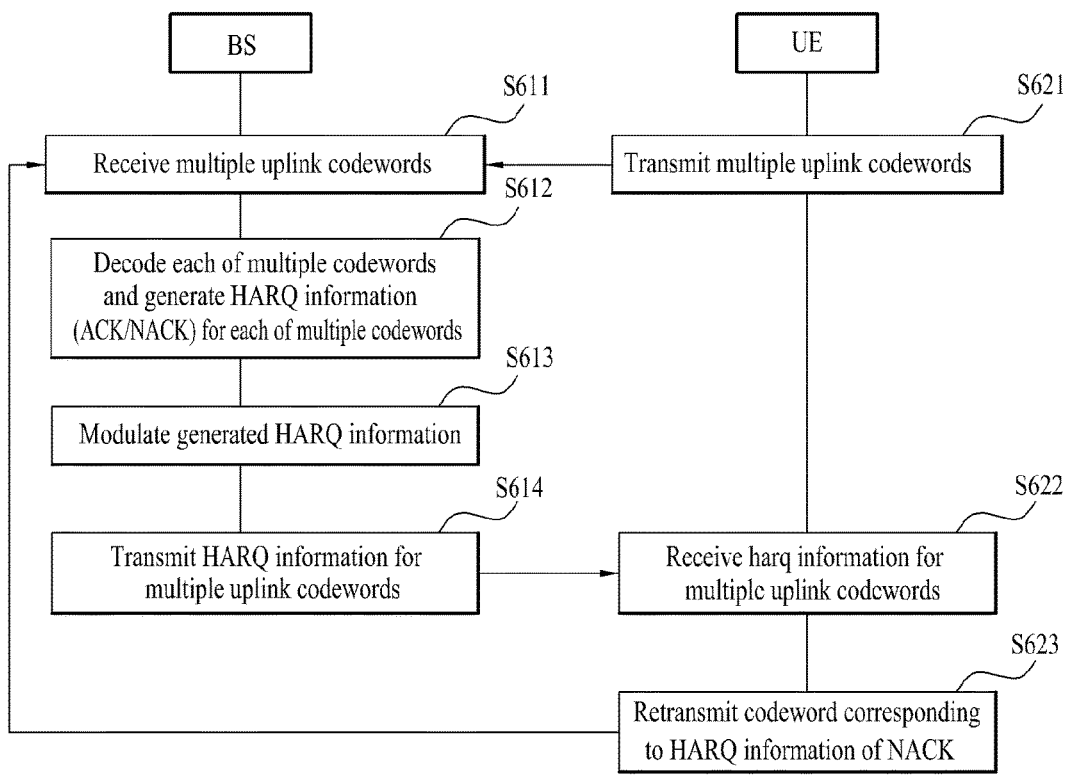
FIG. 6 is a diagram illustrating a method of transmitting and receiving multiple uplink codewords and a method of transmitting and receiving downlink HARQ information in response to transmission of multiple uplink codewords.

FIG. 6 is a diagram illustrating a method of transmitting and receiving multiple uplink codewords and a method of transmitting and receiving downlink HARQ information in response to transmission of multiple uplink codewords.

In step S611, a BS may receive multiple uplink codewords from a UE. Step S621 shows an operation for transmitting multiple uplink codewords at the UE. The multiple uplink codewords may be transmitted by applying a multiple antenna technique or a multiple carrier technique to uplink.

In step S612, the BS may decode the received multiple codewords and generate a HARQ information (ACK/NACK) signal with respect to the multiple codewords based on the decoding result. For example, since a 1-bit ACK/NACK signal may be generated with respect to each of N uplink codewords, a total of N bits of ACK/NACK information may be generated.

In step S613, the BS may modulate the generated HARQ information (ACK/NACK). For example, the N-bit HARQ information of the N codewords may be modulated according to a modulation scheme (e.g., QPSK, N-PSK, N-QAM, etc.) of a higher order. For example, 2-bit HARQ information of two codewords may be modulated using a QPSK scheme.

In step S614, the BS may transmit HARQ information on one or more PHICHs. For example, a total of N-bit HARQ information of the N codewords may be modulated using a scheme of a higher order and may be transmitted on one PHICH. Alternatively, if 1-bit HARQ information is generated with respect to each of the N codewords and a total of N-bit HARQ information is transmitted to the UE, 1-bit HARQ information of each codeword may be transmitted on one PHICH (after modulation using the conventional BPSK scheme) and HARQ information of multiple codewords may be transmitted on a total of N PHICHs. Alternatively, HARQ information of multiple codewords may be represented by 1 bit on one PHICH. For example, if all of N codewords are successfully decoded, ACK may be transmitted and, if decoding of only one of N codewords fails, NACK may be transmitted.

In step S622, the UE may receive HARQ information of the multiple codewords on one or more PHICH.

In step S623, the UE may retransmit the codeword if the HARQ signal is a NACK signal. For example, if the HARQ signal includes HARQ information of each of the multiple codewords (if HARQ information modulated to a higher order on one PHICH is provided or if HARQ information of each codeword is provided on a plurality of PHICHs), the codeword, the HARQ information of which is NACK, may be retransmitted. Alternatively, the HARQ information received on one PHICH indicates an ACK signal if all of the multiple codewords are decoded and indicates a NACK signal if one or more of the multiple codewords are not decoded. If the HARQ information indicates a NACK signal, all of the multiple codewords may be retransmitted. Alternatively, the layers to which the codewords are mapped may be swapped upon retransmission. For example, in case of transmission of two codewords, the layers to which the codewords are mapped upon previous transmission of the two codewords may be swapped and retransmitted. That is, the layers to which the codewords are mapped may be swapped every retransmission.

Figure 7:
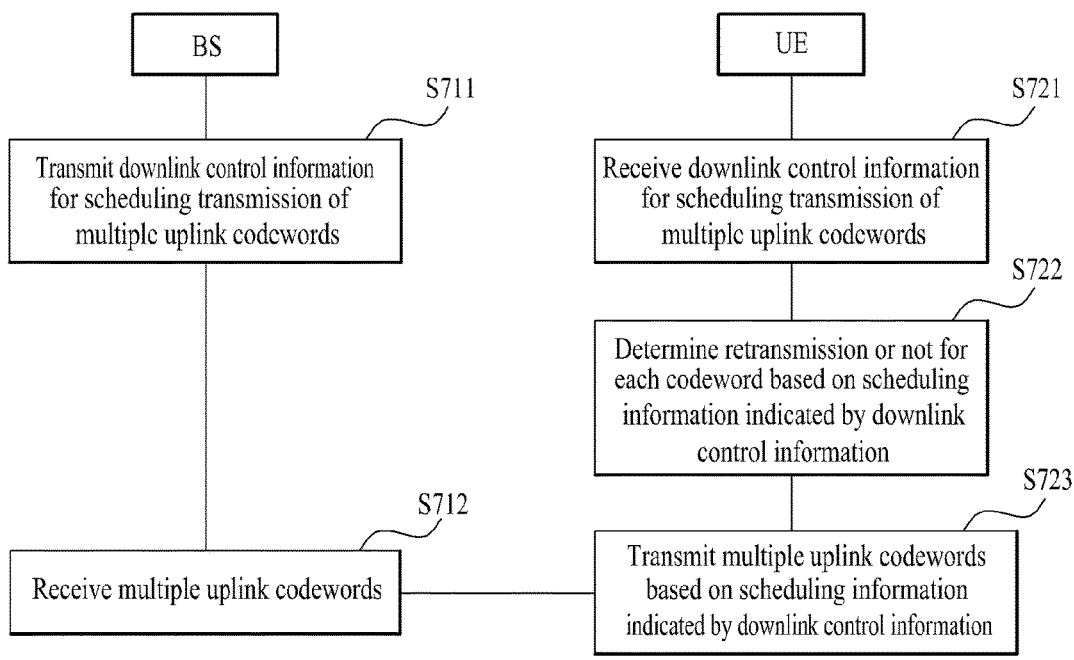
FIG. 7 is a diagram illustrating a method of transmitting and receiving downlink control information for scheduling transmission of multiple uplink codewords and a method of transmitting and receiving multiple uplink codewords.

FIG. 7 is a diagram illustrating a method of transmitting and receiving downlink control information for scheduling transmission of multiple uplink codewords and a method of transmitting and receiving multiple uplink codewords.

In step S711, a BS may generate downlink control information (DCI) including modulation and coding scheme (MCS) information and new data indicator (NDI) information of each of multiple uplink codewords as uplink scheduling information and transmit the DCI on a PDCCH. Step S721 shows an operation for receiving such DCI at a UE on the PDCCH. The DCI may further include one or more of PUSCH resource block allocation information, a TPC command of a scheduled PUSCH, cyclic shift information for a DMRS, an uplink index in case of TDD, a downlink allocation index in case of TDD, CQI request and precoding information, a frequency hopping flag, a resource allocation header, a TPC command for a PUCCH, a transport block-to-codeword swap flag, a carrier indicator and a multi-cluster flag.

In step S711, the UE may determine whether each of the uplink codewords is retransmitted based on the DCI received on the PDCCH. More specifically, if the NDI included in the DCI is toggled from the NDI of previous transmission, new transmission may be performed and, if the NDI included in the DCI is not toggled from the NDI of previous transmission, retransmission may be performed.

In step S723, the UE may transmit multiple uplink codewords based on scheduling information (resource allocation, modulation and coding scheme, etc.) indicated by the DCI. Step S712 shows an operation for receiving the multiple uplink codewords at the BS.

The DCI for scheduling transmission of multiple uplink codewords may be transmitted on the PDCCH having the DCI format of each of Tables 9 to 11.

Although the methods according to the embodiment of the present invention, which are performed at the BS and the UE, are described for clarity of description with reference to FIGS. 6 and 7, the above description of various methods of the present invention are applicable as detailed matters and additional embodiments.

In FIGS. 6 and 7, a BS is described as an example of an uplink receiver and a relay which receives an uplink signal from a UE may perform the same operation. Similarly, in FIGS. 6 and 7, a UE is described as an example of an uplink transmitter and a relay which transmits an uplink signal to a BS may perform the same operation.

Figure 8:
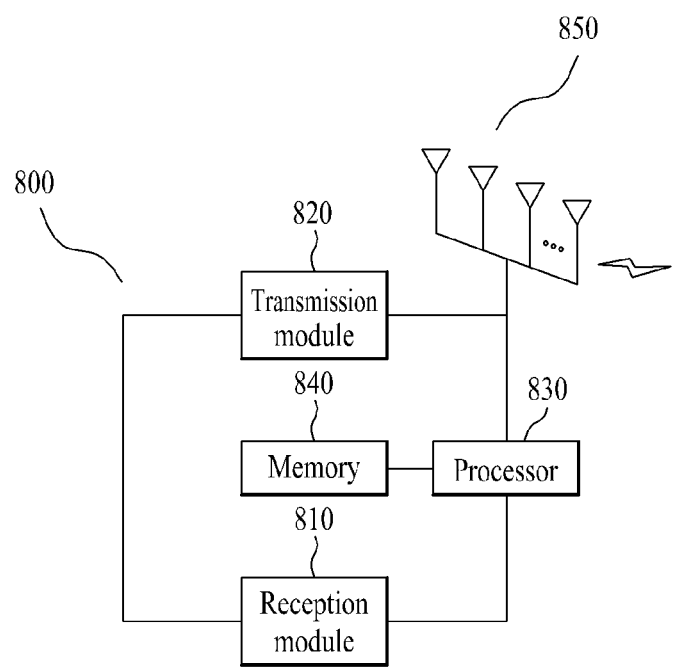
FIG. 8 is a diagram showing the configuration of an exemplary embodiment of a base station apparatus and a user equipment (UE) according to the present invention.

FIG. 8 is a diagram showing the configuration of an exemplary embodiment of a BS apparatus and a UE (or a relay apparatus) according to the present invention.

In FIG. 8, a description of a BS apparatus is equally applicable to a relay apparatus as an uplink receiver and a description of a UE is equally applicable to a relay apparatus as an uplink transmitter.

Referring to FIG. 8, the BS apparatus 800 according to the present invention may include a reception module 810, a transmission module 820, a processor 830, a memory 840 and a plurality of antennas 850. Since the BS apparatus supports MIMO transmission/reception, the BS apparatus includes the plurality of antennas.

The reception module 810 may receive a variety of signals, data and information from a UE (or a relay) in uplink (or backhaul uplink). The transmission module 820 may transmit a variety of signals, data and information to a UE (or a relay) in downlink (or backhaul downlink). The processor 830 may control the overall operation of the BS apparatus 800.

The processor 830 of the BS apparatus for transmitting downlink HARQ information of multiple uplink codewords according to an embodiment of the present invention may be configured to receive multiple uplink codewords via the reception module 810. In addition, the processor 830 may be configured to generate HARQ information of each of the multiple codewords based on the result of decoding each of the multiple codewords. In addition, the processor 830 may be configured to modulate the generated HARQ information and transmit the modulated HARQ information via the transmission module 820 on one or more PHICHs.

The processor 830 of the BS apparatus for transmitting DCI for scheduling transmission of multiple uplink codewords according to another embodiment of the present invention may be configured to generate DCI including MCS information and NDI information of each of the multiple codewords as uplink scheduling information and to transmit a PDCCH including the DCI via the transmission module. The DCI may further include one or more of PUSCH resource block allocation information, a TPC command of a scheduled PUSCH, cyclic shift information for a DMRS, an uplink index in case of TDD, a downlink allocation index in case of TDD, CQI request and precoding information, a frequency hopping flag, a resource allocation header, a TPC command for a PUCCH, a transport block-to-codeword swap flag, a carrier indicator and a multi-cluster flag.

The above description of the methods of the present invention is applicable as detailed matters of additional configurations of the BS apparatus.

Referring to FIG. 8, the UE 800 according to the present invention may include a reception module 810, a transmission module 820, a processor 830, a memory 840 and a plurality of antennas 850. Since the UE supports MIMO transmission/reception, the UE 800 includes the plurality of antennas.

The reception module 810 may receive a variety of signals, data and information from a BS (or a relay) in downlink (or backhaul downlink). The transmission module 820 may transmit a variety of signals, data and information to a BS (or a relay) in uplink (or backhaul uplink). The processor 830 may control the overall operation of the UE 800.

The processor 830 of the UE for transmitting multiple uplink codewords using the HARQ scheme according to an embodiment of the present invention may be configured to transmit the multiple uplink codewords via the transmission module 820 and to receive downlink HARQ information of transmission of multiple uplink codewords via the reception module 810. In addition, the processor 830 may be configured to retransmit the multiple codewords via the transmission module if the HARQ information is a NACK signal. In addition, the HARQ information may be generated and modulated by the BS apparatus based on the result of decoding each of the multiple uplink codewords and may be received by the UE on one or more PHICHs.

The processor 830 of the UE for transmitting multiple uplink codewords scheduled by DCI according to another embodiment of the present invention may be configured to receive DCI including MCS information and NDI information of each of the multiple codewords as uplink scheduling information on a PDCCH via the reception module 810. The processor 830 may be configured to determine whether the multiple uplink codewords are retransmitted based on the NDI information and to transmit the multiple uplink codewords based on scheduling information indicated by the DCI. The DCI may further include one or more of PUSCH resource block allocation information, a TPC command of a scheduled PUSCH, cyclic shift information for a DMRS, an uplink index in case of TDD, a downlink allocation index in case of TDD, CQI request and precoding information, a frequency hopping flag, a resource allocation header, a TPC command for a PUCCH, a transport block-to-codeword swap flag, a carrier indicator and a multi-cluster flag.

The processor of the BS apparatus or the UE performs a function for processing information received by the BS apparatus or the UE or information to be externally transmitted and the memory 840 may store the processed information for a predetermined time and may be replaced with a component such as a buffer (not shown).

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

What is claimed is:

1. A method of transmitting downlink control information (DCI) for scheduling one or more uplink codewords (CWs) by a base station (BS) in a wireless communication system supporting uplink multiple-input multiple-output (UL MIMO), the method comprising:
generating, by the BS, DCI including modulation and coding scheme (MCS) information and new data indicator (NDI) information for each of uplink CWs as uplink scheduling information; and
transmitting, by the BS to a user equipment (UE), the DCI through a physical downlink control channel (PDCCH),
wherein the DCI further includes physical uplink shared channel (PUSCH) resource block allocation information, a transmit power control (TPC) command for a scheduled PUSCH, cyclic shift information for a demodulation reference signal (DMRS), channel state information (CSI) request and precoding information,
wherein the BS determines whether or not to toggle the NDI information for each of the uplink CWs for scheduling uplink retransmission of each of the uplink CWs,
wherein when a number of transmission antennas for UL MIMO is 2, the precoding information is configured to 3 bits indicating a codebook index from one of a rank 1-codebook or a rank 2-codebook, and
wherein when the number of transmission antennas for UL MIMO is 4, the precoding information is configured to 6 bits indicating a codebook index from one of the rank 1-codebook, the rank 2-codebook, a rank 3-codebook or a rank 4-codebook.

2. The method according to claim 1, wherein the DCI further includes an uplink index and a downlink allocation index for time division duplexing (TDD).

3. The method according to claim 2,
wherein the NDI information includes first NDI information for a first uplink CW and second NDI information for a second uplink CW, and
wherein the BS does not toggle the first NDI information if the first uplink CW was not received correctly, and the BS does not toggle the second NDI information if the second uplink CW was not received correctly.

4. The method according to claim 3,
wherein the first uplink CW is retransmitted by the UE when the first NDI information is not toggled, and the second uplink CW is retransmitted by the UE when the second NDI information is not toggled.

5. The method according to claim 4, further comprising:
transmitting a physical hybrid automatic repeat request (HARQ) indication channel (PHICH) indicating an acknowledgement (ACK) or a negative acknowledgement (NACK),
wherein the uplink retransmission of each of the uplink CWs is performed based only on the DCI regardless of the PHICH.

6. The method according to claim 5,
wherein each of the first NDI information and the second NDI information corresponds to 1-bit, and
wherein each of the first NDI information and the second NDI information is either '0' or '1'.

7. A method of receiving downlink control information (DCI) for scheduling one or more uplink codewords (CWs) by a user equipment (UE) in a wireless communication system supporting uplink multiple-input multiple-output (UL MIMO), the method comprising:
receiving, by the UE from a base station (BS) through a physical downlink control channel (PDCCH), DCI including modulation and coding scheme (MCS) information and new data indicator (NDI) information for each of uplink CWs as uplink scheduling information; and
determining, by the UE, whether or not to retransmit each of the uplink CWs based on whether or not the NDI information for each of the uplink CWs is toggled, wherein the DCI further includes physical uplink shared channel (PUSCH) resource block allocation information, a transmit power control (TPC) command for a scheduled PUSCH, cyclic shift information for a demodulation reference signal (DMRS), channel state information (CSI) request and precoding information, wherein when a number of transmission antennas for UL MIMO is 2, the precoding information is configured to 3 bits indicating a codebook index from one of a rank 1-codebook or a rank 2-codebook, and wherein when the number of transmission antennas for UL MIMO is 4, the precoding information is configured to 6 bits indicating a codebook index from one of the rank 1-codebook, the rank 2-codebook, a rank 3-codebook or a rank 4-codebook.

8. The method according to claim 7, wherein the DCI further includes an uplink index and a downlink allocation index for time division duplexing (TDD).

9. The method according to claim 8,
wherein the NDI information includes first NDI information for a first uplink CW and second NDI information for a second uplink CW, and
wherein the first uplink CW is retransmitted by the UE when the first NDI information is not toggled, and the second uplink CW is retransmitted by the UE when the second NDI information is not toggled.

10. The method according to claim 9,
wherein uplink retransmission of each of the uplink CWs is performed based only on the DCI regardless of a physical hybrid automatic repeat request (HARQ) indication channel (PHICH) indicating an acknowledgement (ACK) or a negative acknowledgement (NACK).

11. A base station (BS) transmitting downlink control information (DCI) for scheduling one or more uplink codewords (CWs) in a wireless communication system supporting uplink multiple-input multiple-output (UL MIMO), the BS comprising:
a processor to generate DCI including modulation and coding scheme (MCS) information and new data indicator (NDI) information for each of uplink CWs as uplink scheduling information; and
a transmitter to transmit to a user equipment (UE) the DCI through a physical downlink control channel (PDCCH) under control of the processor,
wherein the DCI further includes physical uplink shared channel (PUSCH) resource block allocation information, a transmit power control (TPC) command for a scheduled PUSCH, cyclic shift information for a demodulation reference signal (DMRS), channel state information (CSI) request and precoding information,
wherein the processor determines whether or not to toggle the NDI information for each of the uplink CWs for scheduling uplink retransmission of each of the uplink CWs,
wherein when a number of transmission antennas for UL MIMO is 2, the precoding information is configured to 3 bits indicating a codebook index from one of a rank 1-codebook or a rank 2-codebook, and
wherein when the number of transmission antennas for UL MIMO is 4, the precoding information is configured to 6 bits indicating a codebook index from one of the rank 1-codebook, the rank 2-codebook, a rank 3-codebook or a rank 4-codebook.

12. The BS according to claim 11, wherein the DCI further includes an uplink index and a downlink allocation index for time division duplexing (TDD).

13. The BS according to claim 12,
wherein the NDI information includes first NDI information for a first uplink CW and second NDI information for a second uplink CW, and
wherein the processor does not toggle the first NDI information if the first uplink CW was not received correctly, and the processor does not toggle the second NDI information if the second uplink CW was not received correctly.

14. The BS according to claim 13,
wherein the first uplink CW is retransmitted by the UE when the first NDI information is not toggled, and the second uplink CW is retransmitted by the UE when the second NDI information is not toggled.

15. The BS according to claim 14,
wherein the transmitter transmits a physical hybrid automatic repeat request (HARQ) indication channel (PHICH) indicating an acknowledgement (ACK) or a negative acknowledgement (NACK), under control of the processor, and
wherein the uplink retransmission of each of the uplink CWs is performed based only on the DCI regardless of the PHICH.

16. The BS according to claim 15,
wherein each of the first NDI information and the second NDI information corresponds to 1-bit, and
wherein each of the first NDI information and the second NDI information is either '0' or '1'.

17. A user equipment (UE) receiving downlink control information (DCI) for scheduling one or more uplink codewords (CWs) in a wireless communication system supporting uplink multiple-input multiple-output (UL MIMO), the UE comprising:
a receiver; and
a processor to control the receiver to receive, from a base station (BS) through a physical downlink control channel (PDCCH), DCI including modulation and coding scheme (MCS) information and new data indicator (NDI) information for each of uplink CWs as uplink scheduling information, and determine whether or not to retransmit each of the uplink CWs based on whether or not the NDI information for each of the uplink CWs is toggled,
wherein the DCI further includes physical uplink shared channel (PUSCH) resource block allocation information, a transmit power control (TPC) command for a scheduled PUSCH, cyclic shift information for a demodulation reference signal (DMRS), channel state information (CSI) request and precoding information,
wherein when a number of transmission antennas for UL MIMO is 2, the precoding information is configured to 3 bits indicating a codebook index from one of a rank 1-codebook or a rank 2-codebook, and
wherein when the number of transmission antennas for UL MIMO is 4, the precoding information is configured to 6 bits indicating a codebook index from one of the rank 1-codebook, the rank 2-codebook, a rank 3-codebook or a rank 4-codebook.

18. The UE according to claim 17, wherein the DCI further includes an uplink index and a downlink allocation index for time division duplexing (TDD).

19. The UE according to claim 18,
wherein the NDI information includes first NDI information for a first uplink CW and second NDI information for a second uplink CW, and
wherein the first uplink CW is retransmitted by the UE when the first NDI information is not toggled, and the second uplink CW is retransmitted by the UE when the second NDI information is not toggled.

20. The UE according to claim 19,
wherein uplink retransmission of each of the uplink CWs is performed based only on the DCI regardless of a physical hybrid automatic repeat request (HARQ) indication channel (PHICH) indicating an acknowledgement (ACK) or a negative acknowledgement (NACK).

* * * * *